United States Patent [19]

Gunnersen et al.

[11] 4,320,938

[45] Mar. 23, 1982

[54] RESILIENT OPTICAL FIBER CONNECTOR

[75] Inventors: Carl E. Gunnersen, Tucker, Ga.; Terry D. Mathis, Mequon, Wis.

[73] Assignee: Bell Telephone Laboratories, Incorporated, Murray Hill, N.J.

[21] Appl. No.: 106,552

[22] Filed: Dec. 26, 1979

[51] Int. Cl.³ .............................................. G02B 7/26
[52] U.S. Cl. ................................................ 350/96.21
[58] Field of Search ................ 350/96.20, 96.21, 96.22

[56] References Cited

U.S. PATENT DOCUMENTS

| | | | |
|---|---|---|---|
| 3,864,018 | 2/1975 | Miller | 350/96.21 |
| 3,910,678 | 10/1975 | McCartney et al. | 350/96.21 |
| 3,982,815 | 9/1976 | Nakayama | 350/96.22 |
| 4,088,386 | 5/1978 | Hawk | 350/96.21 |
| 4,097,129 | 6/1978 | Wellington et al. | 350/96.21 X |
| 4,103,987 | 8/1978 | Kersten | 350/96.21 |
| 4,123,138 | 10/1978 | Morrison | 350/96.21 |
| 4,123,139 | 10/1978 | Sandahl | 350/96.21 |
| 4,142,776 | 3/1979 | Cherin et al. | 350/96.21 |

FOREIGN PATENT DOCUMENTS 2710099 9/1978 Fed. Rep. of Germany ... 350/96.21

OTHER PUBLICATIONS

Freeman et al., "Holding Fixture for Optical Fiber Array Connectors", *Western Elec. Tech. Dig.*, vol. 52, Oct. 1978, pp. 7-8.

Harper et al., "Fiber-Optic Connector," *IBM Tech. Discl. Bull.*, vol. 21, No. 5, Oct. 1978, pp. 2115-2116.

Dakss et al., "Field-Installable Connectors and . . ." *12th Annual Connector Symp.*, Cherry Hill, N.J., Oct. 1979, pp. 198-205.

*Primary Examiner*—John D. Lee
*Attorney, Agent, or Firm*—Sylvia J. Chin; David R. Padnes

[57] ABSTRACT

A connector assembly (10) has been developed with an aligning coupler (300) and connectors (100, 200) which simplify the joining of a pair of mateable optical fiber termination structures (112, 212). The coupler (300) comprises a pair of rigid elongated members (310, 340) having inner surfaces (312, 342) and tapering outer end surfaces (328, 358). Resilient members (370) hold the elongated members together to define a fiber termination structure receiving orifice (380) which has a cross section normally narrower in one dimension than that of the termination structures. Due to the resilient members, the elongated members can separate to ease insertion of the termination structures and then come back together to urge precise-aligning outer surface means (122, 222) on each termination structure into registration against a precisealigning coupler reference surface (332) in the orifice. Thus registration is maintained until the connector assembly can be fastened. Also, each connector comprises a rigid tubular member (170, 270) having an interior bore section (176, 276) with an interior beveled or wedging surface (178, 278) for engaging the corresponding tapering outer surfaces of the elongated members during fastening of the connector assembly. During fastening, the tubular members cause the elongated members to move toward each other transversely to achieve final flush engagement of the termination structures against the precise-aligning coupler reference surface as well as effectively clamping the termination structures in place.

22 Claims, 7 Drawing Figures

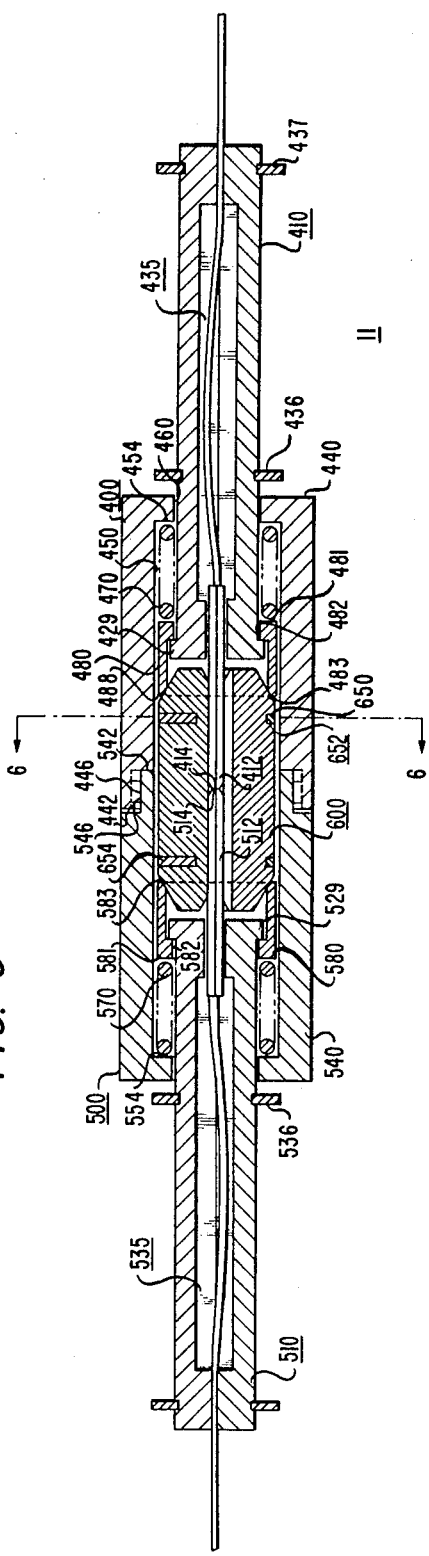

RESILIENT OPTICAL FIBER CONNECTOR

BACKGROUND OF THE INVENTION

1. Field of the Invention

This invention relates to the joining of mating light-transmitting optical fibers and more particularly, to connecting apparatus for optical fibers.

2. Description of the Prior Art

Light-transmitting optical fibers, while desirable for their bandwidth capability, are difficult to handle because they are exceedingly small and fragile. Also, if low-loss joints are to be achieved, mating optical fibers must be precisely aligned axially.

To protect the fibers and to simplify and speed up the connecting process of optical fibers, optical fibers have been grouped and packaged in fiber termination structures where each fiber assumes a known and precise position in the structure in relation to precise-aligning outer surfaces. Also, the ends of the fibers are typically terminated in a common plane with an end surface of the structure substantially normal to their longitudinal axes to form a mating end face for the structure. Hence, when two fiber termination structures are aligned via their precise-aligning outer surfaces and abutted in an end-to-end relationship with each other, mating fibers in the structures are joined as well.

One such fiber termination structure is disclosed in U.S. Pat. No. 3,864,018, issued to Miller and assigned to the assignee of this application. The fiber termination structure disclosed in Miller is designed to terminate one or more linear arrays of fibers with multigrooved aligning chips which can be stacked with the arrays of fibers to form an orderly group of fibers for mass splicing.

In order to implement such fiber termination structures in a practical optical communication system, there is need to develop connecting apparatus incorporating these structures.

Desirably, the connecting apparatus can easily be assembled in the outside plant, as well as in the central office. Also, desirably, the connecting apparatus can achieve a repeatable high level of optical coupling between the mating optical fibers in the fiber termination structures.

It is also desired that the connecting apparatus require a minimum of dexterity on the part of the craftsperson and a minimum of steps in completing a connection.

Finally, it is desired that the connecting apparatus be simple and inexpensive to manufacture, and be made with a minimum of precision parts.

SUMMARY OF THE INVENTION

Pursuant to the invention, a connector assembly has been developed which is easy to assemble and which achieves a repeatable high level of optical coupling between mating optical fibers. An illustrative connecting assembly comprises a coupler with an orifice for receiving the fiber termination structures and two mating connectors housing the fiber termination structures containing the fibers to be mated.

Pursuant to one aspect of the invention, the coupler comprises two rigid elongated members having facing inner surface means with at least one of the elongated members having an inner surface means including a longitudinally-extending channel with a precise-aligning reference surface in the floor of the channel. The elongated members are held together in a parallel side-by-side relationship with resilient elements to form a longitudinally-extending orifice with a cross section which can vary in size along a first axis substantially normal to the facing surface means. Also, the cross section of the orifice is normally smaller along the first axis and slightly larger along a second axis than the cross section in the corresponding dimensions in the fiber termination structures.

Inserting the fiber termination structures is easy because the resilient elements deform to allow their entry. At the same time, the resilient elements can spring back, urging the fiber termination structures into registration with the precise-aligning reference surface in the orifice and holding them in place until final assembly when the fiber termination structures are locked in place.

Pursuant to another aspect of the invention, the rigid elongated members include tapering outer surfaces. As the connectors are fastened after insertion of the termination structures, wedging means in the connectors supply a controlled compressive radial load against the tapering outer surfaces of the elongated members to lock the fiber termination structures in place in the coupler.

The invention and its objects, features and advantages will be more readily discerned from a reading of the description to follow of illustrative embodiments.

BRIEF DESCRIPTION OF THE DRAWING

FIG. 5 is a partially sectioned view of a second embodiment of the optical fiber connector assembly made in accordance with this invention;

FIG. 6 depicts a sectional view along line 6—6 in FIG. 5; and

DETAILED DESCRIPTION

Figure 1:
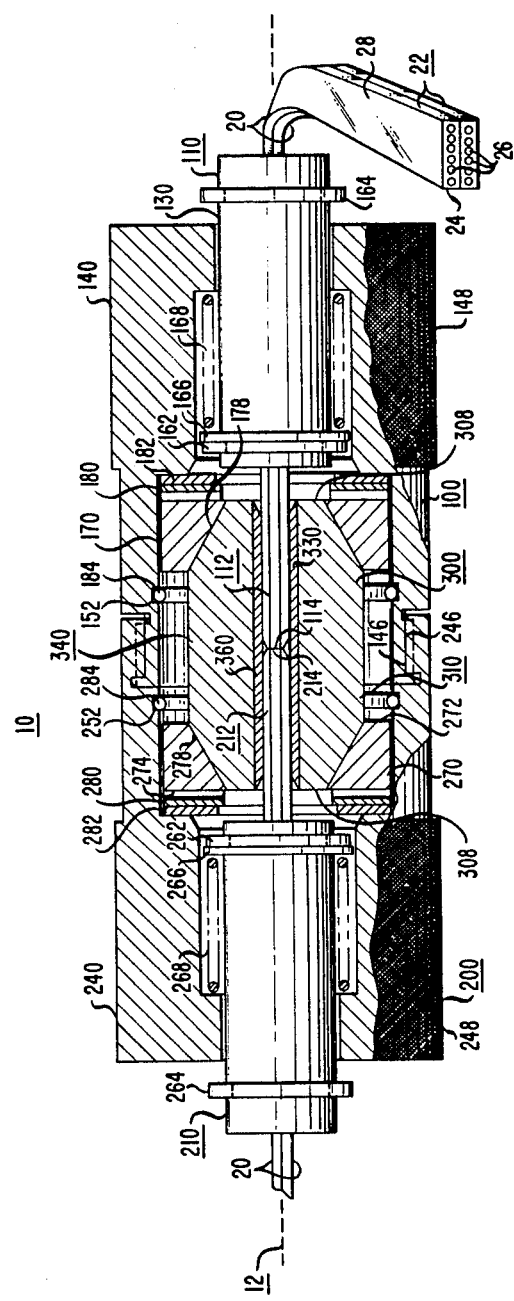
FIG. 1 is a partially sectioned view of one embodiment of an optical fiber connector assembly made in accordance with this invention.

Depicted in FIG. 1 is an illustrative embodiment 10 of a connector assembly made in accordance with this invention. The illustrative connector assembly 10, which comprises a connector 100, a connector 200, and a coupler 300, connects a mating pair of two-ribbon cables 20, where each optical fiber ribbon 22 comprises a linear array 24 of light-transmitting optical fibers 26 contained in a supporting medium 28. The connectors 100 and 200 are identical in configuration but for their fastening surfaces which are complementary.

Figure 2:
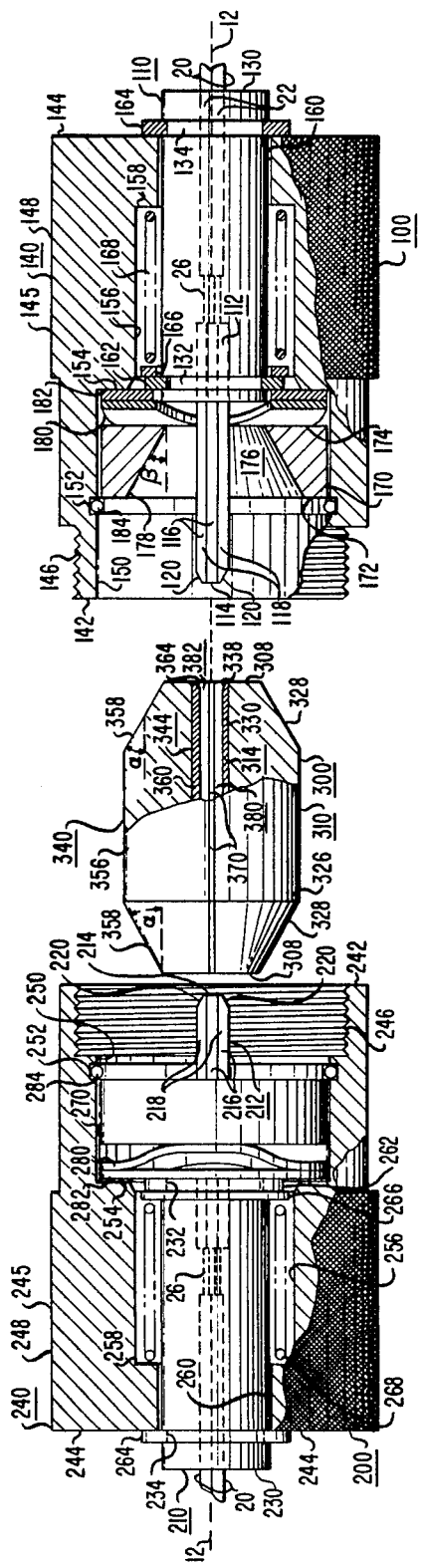
FIG. 2 is a partially sectioned view of the FIG. 1 optical fiber connector assembly before assembly.

Referring to FIG. 2, connector 100 comprises a terminated cable assembly 110 which is housed in a cylindrical connector shell 140. The assembly 110 comprises the end lengths of the two optical ribbons 22 from the associated cable 20, an exposed length of optical fibers 26, a fiber termination structure 112 having a mating end face 114, and a molded strain relief body 130. The body 130, made of a material such as epoxy, partially encapsulates the fiber termination structure 112 along with the ends of the ribbons 22 and the exposed lengths of the fibers 26. The molded body 130 has a cylindrical configuration with annular grooves 132 and 134 on its outer cylindrical surface near either end.

Figure 3:
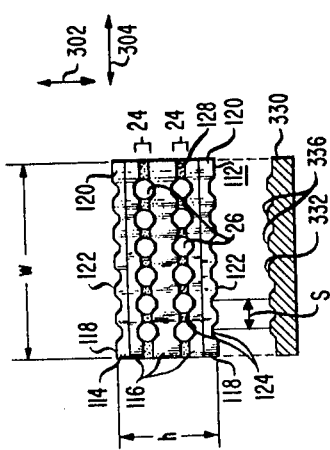
FIG. 3 is an enlarged view of the mating end face of one of the FIG. 1 fiber termination structures and the aligning module of the coupler in cross section.

FIG. 3 shows the mating end face 114 of the termination structure 112 with the two linear arrays 24 of optical fibers 26 sandwiched between adjacent stacked multi-grooved aligning chips 116. The fibers 26 and the chips 116 are held in a permanent fixed relationship with a potting material 128, such as epoxy, which has filled the voids between the chips 116 during preparation of the structure 112. The ends of the fibers 26 are flush with the plane of the mating end face 114. The structure 112 has a predetermined cross section with a height denoted by h and a width denoted by w. The designations are arbitrarily given as height and width because of the orientation of the structure 112 shown in FIG. 3.

As is readily apparent in FIG. 3, the chips 116 are planar substrates with multi-grooved surfaces 124 on opposite faces. Because of the design of the chips 116, the fiber termination structure 112 has precise-aligning outer surfaces 122 on the outer chips 118 when the fiber termination structure 112 is made. The chips 116 are advantageously fabricated by etching silicon substrates, in which such precise-aligning surfaces can be made at a low cost.

The outer chips 118 of the structure 112 also have beveled end surfaces 120 for easing insertion of the structure 112 into an orifice. While the illustrative fiber termination structure 112 terminates two linear arrays 24 of optical fibers 26, it is apparent that the structure 112 can comprise only one array, or many.

The fiber termination structure 112 is similar to that described in U.S. Pat. No. 3,864,018, and to the extent relevant, is hereby incorporated by reference.

Figure 4:
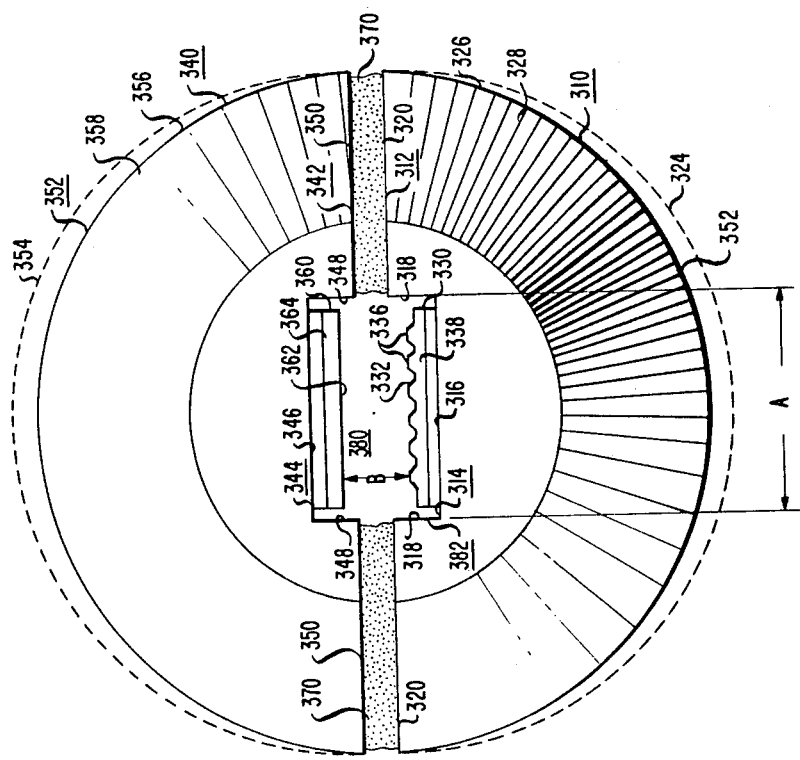
FIG. 4 shows an enlarged end view of one end of the FIG. 1 coupler, the other end being identical.

An aligning module 330, also made from an etched silicon substrate, for the coupler 300 is also illustrated in cross section in FIG. 3. The module 330 includes a ridged surface 332 which defines the precise-aligning reference surface in an orifice 380, as seen in FIG. 4, and is capable of mating with the precise-aligning outer surface 122 of either outer chip 118. When the precise-aligning outer surface 122 of fiber termination structure 112 and the corresponding and identical precise-aligning outer surface of mating fiber termination structure 212 are abutted against the precise-aligning reference surface 332 in the orifice 380, the fiber termination structures 112, 212 are in axial alignment with each other as are the fibers which are precisely positioned therein.

Referring back to FIG. 2, the connector shell 140 is a tubular member having a forward mating end 142, a rear end 144, and an outer cylindrical surface 145. The outer cylindrical surface 145 includes a recessed threaded section 146 near the forward mating end 142 and a radial knurled section 148 near the rear end 144 to aid in gripping the connector 100 during fastening with the other connector 200.

The interior of the shell 140 comprises a front bore section 150 which includes a radial groove 152 and rear radial shoulder 154, a middle bore section 156 which includes a rear radial shoulder 158, and a rear bore section 160. The front bore section 150 is larger than the middle bore section 156, which in turn is larger than the rear bore section 160. The rear bore section 160 is slightly larger in cross section than the outside diameter of the molded body 130.

The terminated cable assembly 110, which inserts from the rear end 144 of the connector shell 140, extends into all three bore sections and is held in the connector shell 140 with the molded body 130. A retaining ring 162 secures to the annular groove 132 on the molded body 130 inside the connector shell 140, while a retaining ring 164 secures to the annular groove 134 on the molded body 130 beyond the rear end 144 of the connector shell 140. The shell 140 loosely contains the assembly 110 to allow for rotational and longitudinal decoupling of the assembly 110.

Rearward movement of the terminated cable assembly 110 is limited by the retaining ring 162 against a flat metal washer 166 and a helical spring 168 in the connector shell 140. The helical spring 168, which abuts the radial shoulder 158, operates to supply a compressive and resilient longitudinal force on the mating end face 114 of the fiber termination structure 112 when it is being joined with the other fiber termination structure 212. As can be seen in FIG. 1, when the structures 112 and 212 are joined, both structures 112 and 212 force each other further back into their connector shells 140 and 240 respectively than where they are in their unassembled state as seen in FIG. 2.

As can be seen in FIG. 2, the mating end face 114 of the fiber terminated structure 112 is recessed in the shell 140 and cannot protrude beyond the shell mating end 142 because of the rear retaining ring 164. This advantageously reduces physical contact which might otherwise harm the mating end face 114 prior to assembly of the connectors 100, 200 and the coupler 300.

The front bore section 150 accommodates a tubular metallic member 170, a curved spring metallic washer 180, and a flat metallic washer 182. Also, the radial groove 152 accommodates a resilient ring 184 which retains the tubular member 170, and washers 180 and 182 in the front bore section 150.

The tubular member 170, which includes a forward end 172 and a rear end 174, comprises an interior bore 176, which is conical in configuration and which tapers from the forward end 172 to the rear end 174 to form an interior conical wedging surface 178 in the longitudinal direction. The wedging surface 178 defines an angle $\beta$ with the longitudinal axis of the coupler, which is coincidental with the axis 12 of the connector assembly in FIGS. 1 and 2. It is 30 degrees in the illustrative embodiment.

The second connector 200 is identical to the first connector 100 as to all parts including the terminated cable assembly 210 except that the shell 240 has an interior recessed threaded portion 246 in its front bore section 250 for mating with the exterior threaded portion 146 in the connector 100.

Referring to FIGS. 2 and 4, the coupler 300 comprises first and second rigid elongated members 310, 340 which are held together in a parallel side-by-side relationship with a pair of elongated strips 370 of resilient and elastomeric material to define a fiber termination structure receiving orifice 380.

Each member 310, 340 comprises a substantially longitudinally-extending facing inner surface means 312, 342. In each inner surface means 312, 342 is a longitudinally-extending channel 314, 344, which is rectangular in cross section. Each channel 314, 344 is defined by longitudinal sidewalls 318, 348 respectively and a floor surface 316, 346 respectively. Adhesively attached to the floor surface 316 of the elongated member 310 is the aligning module 330 mentioned earlier, while a planar slab-like silicon substrate 360 is bonded to the floor 346 of the elongated member 340. Because substrate 360 has a flat orifice surface 362, surface 362 operates only to restrict vertical movement, not to urge two-dimensional alignment like the module 330.

It is apparent that an elongated member 340 can also have an aligning module 330 if desired. It is also apparent that the aligning surfaces 332, 362 can be made integral with the elongated members 310, 340, respectively. Also, it is apparent that other precise-aligning surfaces can be envisioned.

As seen most clearly in FIG. 4, the elongated resilient strips 370 are bonded to the inner surface means 312, 342 along the longitudinal surface edges 320, 350 respectively.

The orifice 380 has a cross section which can vary due to the resilient nature of the elastomeric strips 370 in what is denoted by arrow 302 in FIG. 4 as the vertical direction. The height of the orifice 380 denoted by B is normally smaller than the height h of the fiber termination structures 112 and 212 (in the unassembled state).

However, the orifice 380 is fixed in the horizontal direction as denoted by arrow 304. The spacing between the sidewalls 318 of the member 310 and the spacing between the sidewalls 348 of the member 340 are substantially identical. Their spacings are also the width of the orifice 380 which is denoted by A. The width A is slightly wider than the width w of the fiber termination structures 112, 212. The orifice 380 desirably has a width A less than w+s, where s denotes the spacing between the centers of two adjacent grooves in a chip 116 or the centers of two adjacent ridges 336 in the aligning module 330 as seen in FIG. 3. The tolerances in the manufacture of the other parts of the coupler 300 are substantially less than that of the precise-aligning reference surface 332 of the aligning module 330, but sufficient to help in preliminarily aligning the fiber termination structures 112, 212 in the coupler 300.

While the sidewalls 318, 348 advantageously preliminarily align the structures 112, 212 upon insertion of the structures 112, 212, the sidewalls 318, 348 are sufficiently loose to allow a certain amount of horizontal play so that the termination structures 112, 212 can move to register against the precise-aligning reference surface 332.

In accordance with this invention, insertion and alignment are simple. The elastomeric strips 370 holding the members 310, 340 together can stretch in the vertical direction 302 to increase the height B of the cavity opening 382 to facilitate entry of the fiber termination structures 112, 212 while the sidewalls 318, 348 preliminarily align the structure 112, 212. Then due to their resilience, the strips 370 can spring back to sandwich the fiber termination structures 112, 212 in the coupler 300 between the surfaces 332 and 362 and to register the fiber termination structures 112, 212 against the aligning surface 332 of the module 330.

The elastomeric strips 370 also allow a certain amount of vertical play along the longitudinal axis in the coupler 300. Hence, as one fiber termination structure, say 112, is inserted, the coupler 300 will still hold and register the other fiber termination structure 212 inserted at the other end.

Referring to FIG. 4, advantageously, in the illustrative embodiment, the flat substrate 360 and the aligning module 330 both have beveled entrance surfaces 364 and 338 at either end respectively to enlarge the orifice entrance 382 at either end 308 of the coupler 300.

Referring back to FIG. 2, each elongated member 310, 340 comprises a middle semi-cylindrical outer surface 326, 356, respectively, and semi-conical outer surfaces 328, 358, respectively, at either end. The semi-conical outer surfaces 328, 358 form wedging surfaces which define an angle denoted α with respect to the longitudinal axis of the coupler 300, and are designed for engaging associated wedging surfaces 178, 278 in the connectors 100, 200. In the illustrative embodiment α is 30 degrees.

Once the two fiber termination structures 112, 212 of both connectors 100, 200 have been inserted into the coupler 300, a craftsperson need only fasten the connectors 100 and 200 by threading them together to complete the joint. Of course, index matching fluid or gel can be inserted into the orifice 380 prior to insertion of either structure 112 or 212 to improve the optical coupling. It is also apparent that the coupler 300 can include a separate opening for the insertion of index matching fluid.

Referring to FIG. 1, as the connectors 100 and 200 are fastened, the curved spring washer 180, 280 in each connector 100, 200, respectively, applies a controlled longitudinal force against the tubular member 170, 270 respectively. In turn, the interior conical surfaces 178, 278 of the conical members 170, 270 urge the elongated members 310, 340 together to effect final alignment of the fiber termination structures 112, 212 against the precise-aligning reference surface 332 (FIG. 4) in the coupler 300.

In FIG. 4, the broken lines 324, 354 show in exaggeration the displacement of the elongated members 310, 340 made after insertion of the fiber termination structures 112, 212 so that the coupler 300 is shown somewhat elliptical in cross section. As a result, when the connectors 100 and 200 are initially fastened, the conical surfaces 178, 278 of the conical members 170, 270 make primary contact with the members 310, 340 at the areas of the surfaces 328, 358 most normal to direction of the needed radial or transverse force to transfer most of the longitudinal axial loads into urging the members 310, 340 against each other.

Referring back to FIG. 1, once the elongated members 310 and 340 have been compressed to define a circular cross section in conformance with the interior conical surfaces 178, 278 of the tubular members 170, 270, little additional axial load is transferred into compression of the elongated members 310, 340. Thus, a controlled holding force maintains the position of the fiber termination structures 112, 212 in the orifice 380. The curved spring washers 180, 280 also act to limit and control the axial load made on the tubular members 170, 270 during connector fastening.

It is apparent that the coupler 300 can be incorporated in one of the connectors 100 or 200 so that insertion of only one of the fiber termination structures 112 or 212 is needed.

Also, it is apparent that one of the connectors 100, 200 can be adapted for panel mounting. In such a situation, the coupler 300 can be a part of the panel-mounted connector or a separate component. In either case, it is apparent that caps can be designed to cover the mating ends 142, 242 of the connectors 100, 200 when they are not in use.

Also, it is apparent that an outer housing for the coupler 300 can be used where the housing includes fastening means for both connectors 100 and 200. Then the connectors 100, 200 can be identical in configuration.

FIG. 5 depicts an alternate embodiment 11 of the optical fiber connector assembly in which two single-ribbon cables 22 are shown connected. Similar to the FIG. 1 assembly 10, the FIG. 5 assembly 11 comprises three major components: a connector 400, a connector 500, and a coupler 600. The connectors 400 and 500 are identical but for their threaded fastening surfaces, 446 and 546 respectively, which complement each other.

Figure 7:
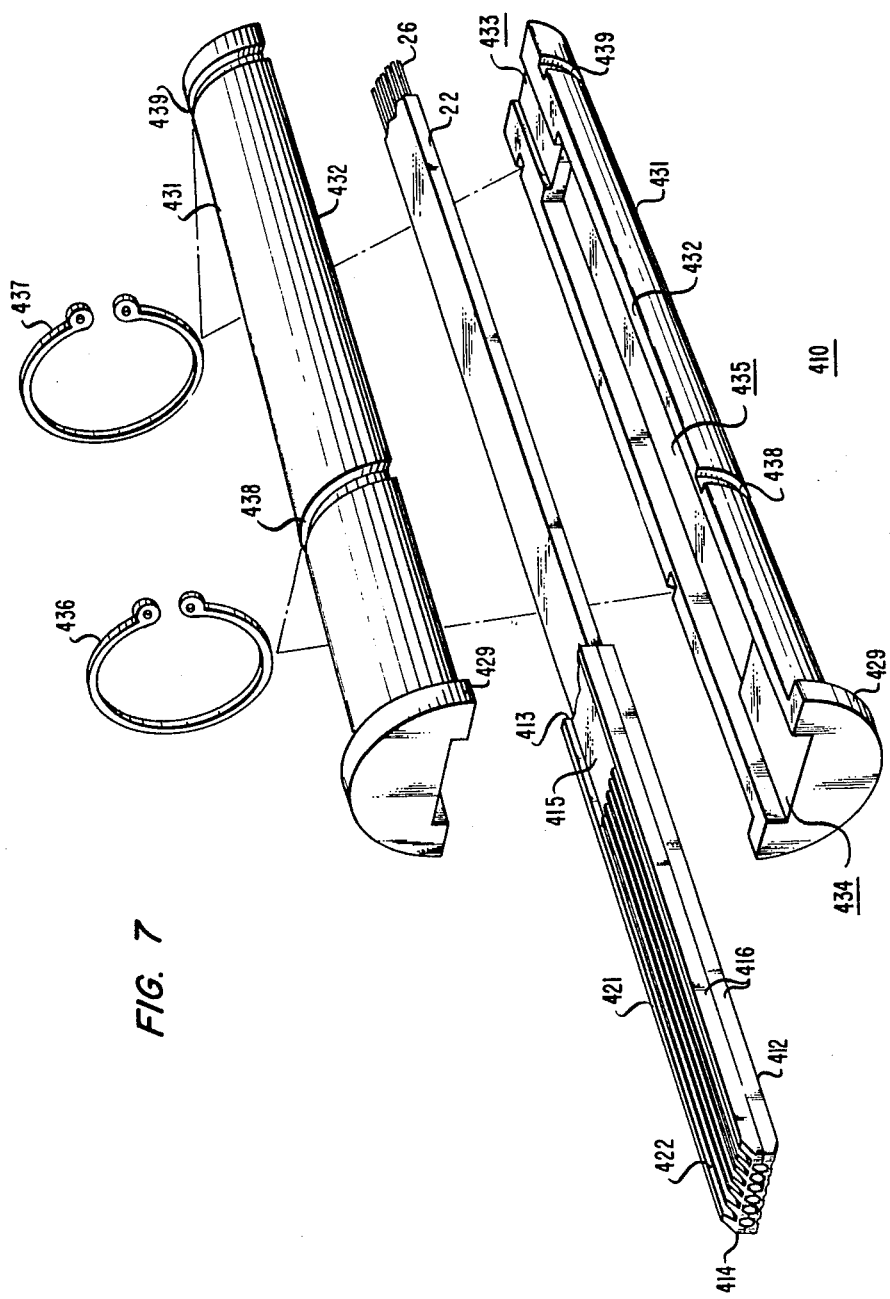
FIG. 7 depicts in exploded view one of the FIG. 5 cable termination assemblies.

Referring to FIG. 7, the ribbon 22 terminates into the fiber termination structure 412 in this embodiment. The grooved chips 416 have on either face near the end face 413 opposite the mating end face 414, a grooved section 415 for accommodating the end of the ribbon 22. An unused grooved section 415 can be seen in FIG. 7 on the outer surface 421 of the termination structure 412. The grooved section 415 does not affect the alignment capability of the precise-aligning outer surface 422 since it is more recessed.

In this embodiment, the ribbon 22 and the fiber termination structure 412 are housed in a two-part ribbon terminator 430 comprising first and second semi-cylindrical members 431 to form the cable termination assembly 410. The inner surfaces 432 of the members 431 form together a rectangular bore 433 for snugly receiving the ribbon 22, a second rectangular bore 434 for loosely containing the fiber termination structure 412, and an accumulator bore region 435 for loosely containing and allowing random movement of the ribbon 22 and the fiber termination structure 412. The semi-cylindrical members 431 are held together with retainer rings 436, 437, along annular grooves 438, 439 on the outer surfaces of the members 431. The members 431 also include outer radial flanges 429 at their forward ends. The ribbon 22 is securely held in the bore 433 with adhesive while the fiber termination structure 412 is mechanically decoupled from the bore 434.

Referring back to FIG. 5, the connector 400 includes a connector shell 440 which comprises a forward bore section 450, a radial shoulder 454, and a rear bore section 460 for loosely receiving the termination assembly 410. The forward bore section 450 accommodates a compression spring 470 and a tubular member 480. The tubular member 480 includes an inner radial flange 482 adjacent its rear end 481 and an interior beveled surface 483 at its forward end 488. The radial flange 482 interlocks with the outer radial flanges 429 of the semicylindrical members 431. The compression spring 470 is disposed between the tubular member 480 and the radial shoulder 454 of the connector shell.

Before the connectors 400 and 500 are assembled, the retaining rings 436, 536 limit forward movement of fiber termination structures 412, 512 so that the mating end faces 414, 514 do not protrude beyond the mating ends 442, 542 of the connector shells 440, 540.

FIG. 6 depicts in transverse cross section, the coupler 600 with elongated members 610 and 640. Member 610 includes a longitudinally-extending channel 614 with an aligning module 630 adhered to the floor 616 of the channel 614. The members 610, 640 are designed so that the orifice 680 for receiving the termination structures 412, 512 is in substantial coaxial alignment with the axis of the coupler 600. The elongated members 610 and 640 are held together with resilient annular springs 650 caught in annular grooves 652 on the outer surfaces of the members 610, 640. In this embodiment, the annular springs 650 are made of metallic material. The member 440 includes a pin 654 protruding in each groove 652 to prevent rotation of the corresponding springs 650.

Referring back to FIG. 5, in this embodiment, the springs 470, 570 operate to supply the needed axial forces for the tubular members 480, 580 respectively and the termination assemblies 410, 510 respectively as the connectors 400, 500 are fastened together. The interior beveled annular surfaces 483, 583 of the tubular members 480, 580 respectively operate as wedging surfaces to urge the elongated members 610, 640 of the coupler together in the transverse direction to lock the termination structures 412, 512 in place.

The stiffness of each ribbon 22 is used to supply the axial force at the mating end faces 414, 514 of the termination structures 412, 512 respectively, during abutment of the two structures 412, 512 in the coupler 600. As can be seen in exaggerated fashion in FIG. 5, the ribbons 22 undulate in the accumulator bore regions 435, 535 respectively as fiber termination structures 412, 512 push against each other axially.

Also, in this embodiment, the fiber termination structures 412, 512 are loosely contained by the bores 434, 534 so that they are able to move somewhat three-dimensionally during insertion into the coupler 600 to allow for greater flexibility of the connectors 400 and 500 and more protection of the rigid fiber termination structures 412, 512.

While certain illustrative embodiments of the invention have been shown and described, it should be apparent that various modifications can be made therein without departing from the scope of the invention.

We claim:

1. An article (300) for facilitating precise alignment of a fiber termination structure (112) containing at least one light-transmitting optical fiber (26) where the termination structure has a predetermined cross section and where the termination structure has at least one precise-aligning outer surface means (122), the article comprising:

first (310) and second (340) rigid elongated members, each having an inner longitudinally-extending surface means (312, 342), at least the inner surface means of the first member including precise-aligning reference surface means (332) for engaging the termination structure outer surface means to achieve precise alignment of the fiber termination structure in the article; and means for resiliently maintaining (370) the inner surface means of the members in a facing relationship to define a fiber termination structure receiving orifice (380) with a cross section having a first dimension normally smaller than a corresponding first dimension of said predetermined cross section, where the maintaining means is capable of deforming so as to increase said first dimension for insertion of the termination structure while maintaining a second dimension of said receiving orifice cross section orthogonal to said first dimension, and then decrease said first dimension to urge the termination structure surface means into registration against the reference surface means.

2. The article (300) pursuant to claim 1 where the receiving orifice (380) has at least one entrance (382) with beveled surfaces (338, 364).

3. An article (300) for facilitating precise end-to-end axial alignment of mating light-transmitting optical fibers (26) in first and second mating fiber termination structures (112, 212), each termination structure comprising an aligning structure containing at least one optical fiber with a mating end, where each termination structure has a predetermined cross section and a mating end face (114, 214) including the mating end of the contained fiber, and where at the end face the fiber is held in a precise position in relation to at least one precise-aligning outer surface means (122, 222) of the aligning structure, the article comprising:

first (310) and second (340) rigid elongated members, each having an inner longitudinally-extending surface means (312, 342), at least the inner surface means of the first member including precise-aligning reference surface means (332) for engaging the outer surface means of the termination structures to achieve precise alignment of the fiber termination structures in the article; and means for resiliently maintaining (370) the inner surface means of the members in a facing relationship to define a fiber termination structure receiving orifice (380) with a cross section having a first dimension normally smaller than a corresponding first dimension of said predetermined cross section, where the maintaining means is capable of deforming so as to increase said first dimension for insertion of the termination structures at either end of the article while maintaining a second dimension of said receiving orifice cross section orthogonal to said first dimension and then decrease said first dimension to urge the surface means of the termination structures into registration against the reference surface means to thereby align the fibers in the article.

4. The article (300) pursuant to claim 1 or 3 where the inner surface means (312) comprises:
a longitudinally-extending channel (314) continuous with both ends (308) of the article;
longitudinally-extending edge surfaces (320) on either side of the channel; and
precise-aligning reference surface means (322) in the channel.

5. The article (300) pursuant to claim 1 or 3 where the maintaining means (370) is constructed of resilient material.

6. The article (300) pursuant to claim 1 or 3 where the maintaining means (370) comprises:
elastomeric material bonded to the inner surface means (312, 342) of the elongated members (310, 340).

7. The article (300) pursuant to claim 1 or 3 where each elongated member (310, 340) comprises at least one tapering outer surface (328, 358), the tapering outer surfaces of both members being near either end (308) of the article.

8. The article (300) pursuant to claim 1 or 3 having a longitudinal axis where each elongated member (310, 340) comprises near either end (308) of the article, an outer surface (328, 358) which is angularly disposed with the axis of the article, and where each of the surfaces converge toward the nearer end.

9. The article (300) pursuant to claim 1 or 3 where each elongated member (310, 340) comprises: at least one substantially semi-conical outer surface (328, 358).

10. The article (300) pursuant to claim 1 or 3 where the reference surface means (332) comprises a plurality of precisely spaced longitudinally-extending ridges (336).

11. The article (300) pursuant to claim 1 or 3 where each of said inner longitudinally-extending surface means defines a channel (314) having a width slightly greater than the termination structure (112, 212), and where the reference surface means (332) in the first member (310) is normally spaced from an opposite surface in the second member (340) by less than the height of the termination structure.

12. An article (300) for facilitating precise alignment of a fiber termination structure (112) containing at least one light-transmitting optical fiber (26) where the termination structure has a predetermined cross section and where the termination structure has at least one precise-aligning outer surface means (122), the article comprising:

a plurality of rigid elongated members (310, 340), each member having an inner longitudinally-extending surface means (312, 342) and an outer surface means having at least one tapering outer surface (328, 358), where the tapering outer surfaces of said plurality of rigid elongated members are held near the same end of the article;

precise-aligning reference surface means (332) for engaging the termination structure outer surface means to achieve precise alignment of the fiber termination structure in the article; and means for resiliently maintaining (370) the members together in a substantially parallel facing relationship to define a fiber termination structure receiving orifice (380), with a cross section having a first dimension normally smaller than a corresponding first dimension of said predetermined cross section, where the maintaining means is capable of deforming so as to increase said first dimension for insertion of the termination structure while maintaining a second dimension of said receiving orifice cross section orthogonal to said first dimension, and then decrease said first dimension to urge the termination structure surface means into registration against the reference surface means which defines a surface of the orifice.

13. A connector (10) comprising:
an optical fiber termination structure (112) comprising a mating end face (114), precise-aligning outer surface means and at least one light-transmitting optical fiber;
a connector shell (140) having a forward (142) and a rear end (144);
means for containing (130, 162) the fiber termination structure in the shell such that the mating end face is recessed from the forward end of the connector shell, said containing means capable of rotational and longitudinal movement within said shell;
a coupler mounted in said forward end comprising first and second rigid elongated members (310, 340), each member having an inner surface means (312, 342), at least the inner surface means of the first member including reference surface means (332) for engaging the outer surface means of said termination structure; and
means for resiliently maintaining (370) the elongated members together to define a fiber termination structure receiving orifice (380) with a cross section having a first dimension normally smaller than a corresponding first dimension of the termination structure cross section, where the resilient maintaining means is capable of deforming so as to increase said first dimension for insertion of said termination structure while maintaining a second dimension of said receiving orifice cross section orthogonal to said first dimension, and then decrease said first dimension to urge the outer surface means of said termination structure into registration against the reference surface means; and means for supplying (170) a transverse compressive load on said elongated members.

14. The connector (100) pursuant to claim 13 where the connector further comprises:
means for resiliently urging (168) the fiber termination structure (112) to the forward end (142) of the connector shell (140).

15. The connector (100) pursuant to claim 13 where the supplying means (170) comprises:
a tubular member (170) having a rear end face (174) and a wedging surface means (178); and
means for resiliently exerting (180) a longitudinal force against the rear end face of the tubular member.

16. The connector (100) pursuant to claim 13 further comprising:
means for retaining (152, 184) the transverse compressive load-supplying means (170) in the connector shell (140).

17. The connector (100) pursuant to claim 13 where the connector shell (140) comprises surface means for fastening (146) with a mating connector (200).

18. The connector (100) pursuant to claim 13 where the connector terminates optical fiber ribbons (22) and where the connector comprises:
means for (130) strain relieving the optical fiber ribbons (22).

19. An optical fiber connector assembly (10) comprising:
substantially identical and mateable first and second optical fiber termination structures (112, 212), each comprising:
at least one light-transmitting optical fiber (16) having a mating end face, and a rigid aligning structure (116, 216) which secures the fiber in a precise location in relation to precise-aligning outer surface means (122, 222);
a coupler (300) comprising:
first and second rigid elongated members (310, 340), each member having an inner surface means (312, 342), at least the inner surface means of the first member including reference surface means (332) for engaging the outer surface means of each termination structure; and
means for resiliently maintaining (370) the elongated members together to define a fiber termination structure receiving orifice (380) with a cross section having a first dimension normally smaller than a corresponding first dimension of the cross section of the termination structures, where the resilient maintaining means is capable of deforming so as to increase said first dimension for insertion of each termination structure while maintaining a second dimension of said receiving orifice cross section orthogonal to said first dimension, and then decrease said first dimension to urge the outer surface means of each termination structure into registration against the reference surface means; and
means for clamping (170, 270) the members together to secure the termination structures and the optical fibers contained therein in precise alignment.

20. The assembly (10) pursuant to claim 19 where the inner surface means (312) of the elongated member (310) comprises:
a longitudinally-extending channel (314) continuous with both ends (308) of the coupler (300);
longitudinally-extending edge surfaces (320) on either side of the channel; and
precise-aligning reference surface means (332) in the channel.

21. The connector assembly (10) pursuant to claim 19 where the clamping means comprises:
first and second connectors (100, 200), where each connector comprises:
a connector shell (140, 240) for substantially containing the termination structure (112, 212);
means for fastening (146, 246) the connector assembly; and
means for urging (170, 270) the elongated members (310, 340) together.

22. The connector assembly (10) pursuant to claim 21 where the elongated members (310, 340) in the coupler (300) include tapering outer surfaces (328, 358) near either end (308) of the coupler; and
where in each of said first and second connectors (100, 200), each of said urging means (170, 270) comprises:
wedging surface means (178, 278) for engaging the tapering outer surfaces of the elongated members so that as the connectors are fastened end-to-end, the elongated members are urged toward each other transversely to lock the termination structures (112, 212) in place.

* * * * *